(12) United States Patent
Tseng et al.

(10) Patent No.: US 8,641,803 B2
(45) Date of Patent: Feb. 4, 2014

(54) GAS-ASSISTED HYDROGEN DESORPTION METHOD AND APPARATUS FOR HYDROGEN STORAGE MATERIAL

(75) Inventors: Huan-Hsiung Tseng, Miaoli County (TW); Cheng-Hsiang Tung, Taoyuan County (TW); Ming-Sheng Yu, Taipei (TW)

(73) Assignee: Institute of Nuclear Energy Research Atomic Energy Council, Executive Yuan, Taoyuan County (TW)

( * ) Notice: Subject to any disclaimer, the term of this patent is extended or adjusted under 35 U.S.C. 154(b) by 241 days.

(21) Appl. No.: 13/206,025

(22) Filed: Aug. 9, 2011

(65) Prior Publication Data
US 2012/0107226 A1    May 3, 2012

(30) Foreign Application Priority Data
Oct. 28, 2010    (TW) ................................ 99220842 U

(51) Int. Cl.
*F17C 11/00*    (2006.01)
(52) U.S. Cl.
USPC ................................ 95/104; 96/143; 206/0.7
(58) Field of Classification Search
USPC ................ 95/104; 96/143; 423/648.1, 658.2; 429/515; 502/526
See application file for complete search history.

(56) References Cited

U.S. PATENT DOCUMENTS

| 4,134,490 | A | * | 1/1979 | Turillon et al. | 206/0.7 |
| 4,343,770 | A | * | 8/1982 | Simons | 422/112 |
| 5,980,608 | A | * | 11/1999 | Dietz et al. | 95/12 |
| 6,019,823 | A | * | 2/2000 | Tischler et al. | 96/108 |
| 8,002,880 | B2 | * | 8/2011 | Carruthers | 96/108 |
| 8,221,532 | B2 | * | 7/2012 | Carruthers et al. | 96/148 |
| 8,282,023 | B2 | * | 10/2012 | Olander et al. | 239/418 |

FOREIGN PATENT DOCUMENTS

WO    WO 2006/119428 A2 * 11/2006

* cited by examiner

*Primary Examiner* — Frank Lawrence, Jr.
(74) *Attorney, Agent, or Firm* — WPAT, PC; Justin King

(57) ABSTRACT

The present invention relates to a gas-assisted hydrogen desorption method and apparatus, and more particularly, to a method for desorbing hydrogen from a self-catalyzing hydrogen storage material that is assisted by a carrier gas so as to further enable the portion of hydrogen containing in the self-catalyzing hydrogen storage material that can not be desorbed by conventional hydrogen desorption methods to be desorbed, and thus increase the amount of hydrogen to be released from the a self-catalyzing hydrogen storage material.

8 Claims, 3 Drawing Sheets

GAS-ASSISTED HYDROGEN DESORPTION METHOD AND APPARATUS FOR HYDROGEN STORAGE MATERIAL

FIELD OF THE INVENTION

The present invention relates to a gas-assisted hydrogen desorption method and apparatus, and more particularly, to a method for desorbing hydrogen from a self-catalyzing hydrogen storage material that is assisted by a carrier gas.

BACKGROUND OF THE INVENTION

Hydrogen energy has a low pollution, and environmental advantages. The main by-product of using hydrogen energy is water. Moreover, hydrogen energy is a secondary energy source, which will be able to develop a more efficient and sustainable energy and diversity of supply and demand system when the production, storage, transmission and application of technical barriers are overcome. To make it convenient to use hydrogen energy, the most obstacle need to overcome is the storage technology.

The methods span two approaches, including storing in a container and storing in a hydrogen storage material.

The method of storing hydrogen in a container is to compress the gaseous hydrogen into a container with high pressure or to pour the liquid hydrogen into a container with low temperature. However, the method of compression hydrogen storage has a safety concern and the method of liquid hydrogen storage has a problem of energy consumption.

The method of storing hydrogen in a hydrogen storage material is to seal the hydrogen in a material by the bond between hydrogen and the material. Generally, hydrogen storage materials include metal hydrides, chemical hydrides and sorption materials. The hydrogen storage of metal hybrides which can desorb hydrogen at room temperature is few. The metal hybride with larger hydrogen storage have to desorb at higher temperature. The chemical hybrids can absorb and desorb hydrogen at a proper temperature and have high hydrogen storage, but the chemical hybrids are disposable materials. The sorption materials store hydrogen with large surface area.

The temperature required for the hydrogen desorption of the majority of hydrogen storage materials is about 300~400° C. higher than room temperature. And it is a lack of research of method for improving hydrogen desorption for hydrogen storage materials.

Therefore, it is in need of a gas-assisted hydrogen desorption method and apparatus.

SUMMARY OF THE INVENTION

In view of the disadvantages of prior art, the primary object of the present invention is to provide a gas-assisted hydrogen desorption method and apparatus aiming for hydrogen desorption improvement.

To achieve the above object, the present invention provides a gas-assisted hydrogen desorption apparatus, comprising: a hydrogen cartridge, comprising a first valve in one side and connecting with a flow controller in the other side; a hydrogen storage material, disposed in the hydrogen cartridge; a storage tank, comprising a second valve in one side and connecting with the flow controller by a third valve in the other side, wherein the storage tank is filled with a carrier gas.

The present invention also provides a gas-assisted hydrogen desorption method, comprising the following steps: providing a gas-assisted hydrogen desorption apparatus, wherein the hydrogen has already been stored in the hydrogen cartridge; turning on the first valve to desorb the hydrogen storing in the hydrogen cartridge; when the pressure in the hydrogen cartridge decrease to atmospheric pressure, turning on the third valve to introduce the carrier gas into the hydrogen cartridge; maintaining the third valve on until the hydrogen stored in the hydrogen cartridge cannot be desorbal anymore.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein.

DESCRIPTION OF THE EXEMPLARY EMBODIMENTS

For your esteemed members of reviewing committee to further understand and recognize the fulfilled functions and structural characteristics of the invention, several exemplary embodiments cooperating with detailed description are presented as the follows.

Figure 1:
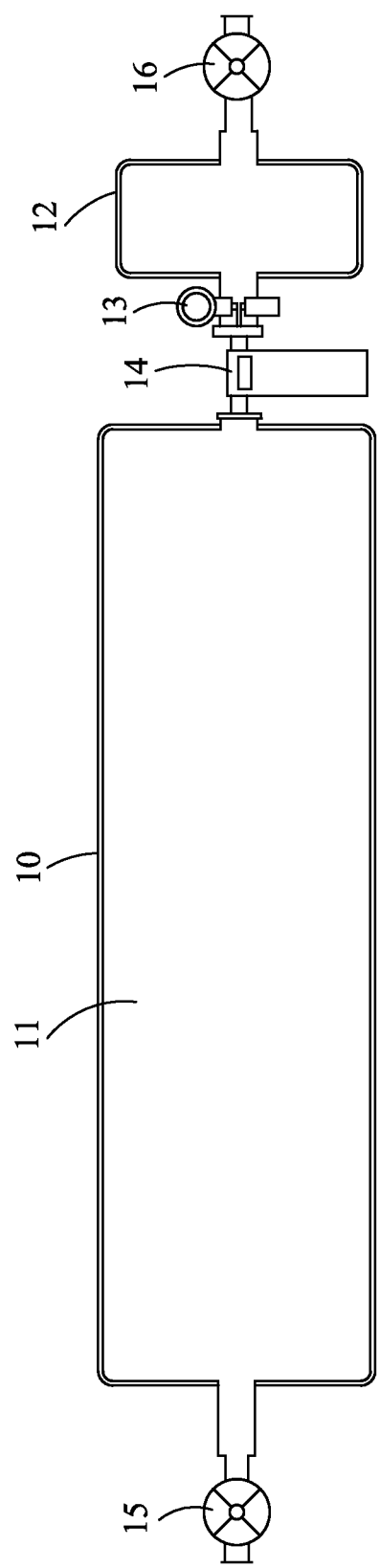
FIG. 1 is a schematic diagram showing a gas-assisted hydrogen desorption apparatus

Please refer to FIG. 1, which is a schematic diagram showing a gas-assisted hydrogen desorption apparatus according to the present invention. As shown in FIG. 1, a gas-assisted hydrogen desorption apparatus 1, comprising: a hydrogen cartridge 10, comprising a first valve 15 in one side, and connecting with a flow controller 14 in the other side.

A hydrogen storage material 11, dispossing in the hydrogen cartridge 10. Wherein the hydrogen storage material 11 using in this embodiment is activated carbon supported catalysts. In application, the hydrogen cartridge 10 can also be activated carbon materials, carbon nanotubes, or microporous metal organic materials.

A storage tank 12, comprising a second valve 16 in one side and connecting with the flow controller 14 by a third valve 13 in the other side, wherein the storage tank 12 is filled with a carrier gas. In this embodiment, the carrier gas is hydrogen. The third valve 13 controls whether the carrier gas introduced into the hydrogen cartridge 10. The flow controller 14 controls the flow rate of the carrier gas.

Figure 2:
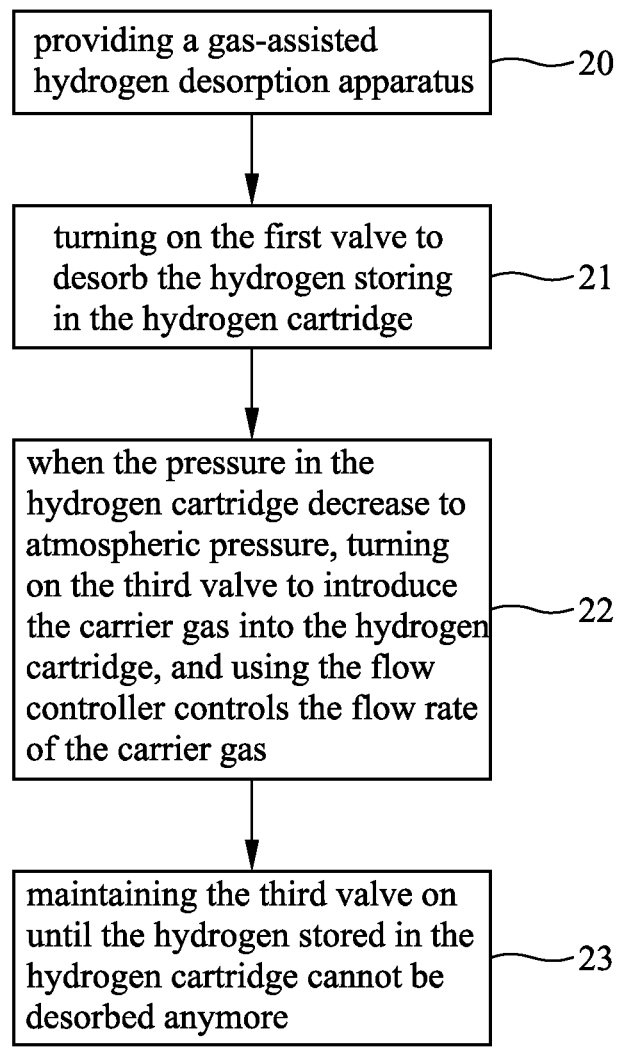
FIG. 2 is a flow chart showing a gas-assisted hydrogen desorption method

Please refer to FIG. 2, which is a gas-assisted hydrogen desorption method according to the present invention. As shown in FIG. 2, step 20, providing a gas-assisted hydrogen desorption apparatus 1, wherein the hydrogen has already been stored in the hydrogen cartridge 10.

Step 21, turning on the first valve 15 to desorb the hydrogen storing in the hydrogen cartridge 10.

Step 22, when the pressure in the hydrogen cartridge 10 decrease to atmospheric pressure, turning on the third valve 13 to introduce the carrier gas into the hydrogen cartridge 10, and using the flow controller 14 controls the flow rate of the carrier gas to 100 sccm.

Step 23, maintaining the third valve 13 on until the hydrogen stored in the hydrogen cartridge 10 cannot be desorbed anymore.

Figure 3:
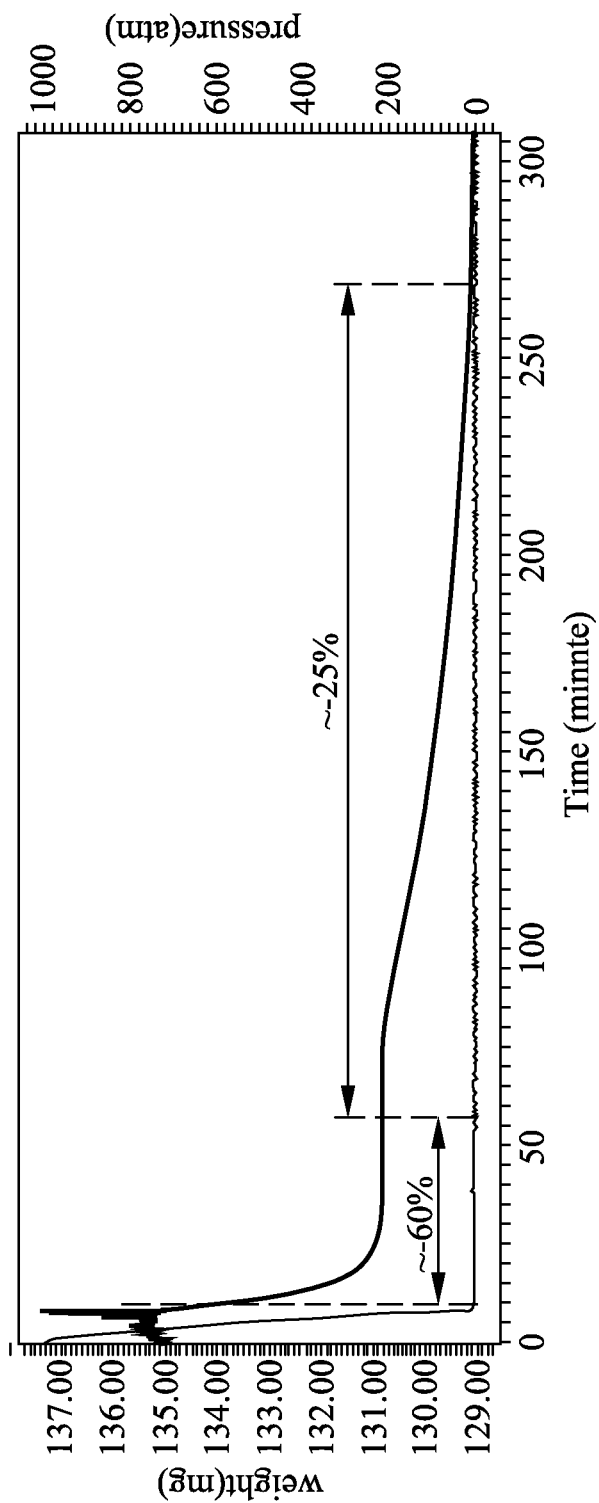
FIG. 3 is a diagram showing the pressure and the weight sum of the hydrogen storage material and the hydrogen absorbed in the hydrogen cartridge

Please refer to FIG. 3, which is a diagram showing the pressure and the weight sum of the hydrogen storage material and the hydrogen absorbed in the hydrogen cartridge. Wherein the upper curve shows the variation of the pressure in the hydrogen cartridge, and the lower curve shows the weight sum of the hydrogen storage material and the hydrogen absorbed. As showing in FIG. 3, when the time goes to 60 minutes, the pressure in the hydrogen cartridge goes to atmospheric pressure, and the desorption hydrogen is 60% of the storage of the hydrogen storage material. At the same time, introducing the carrier gas into the hydrogen cartridge. When the time goes to 300 minutes, the desorption hydrogen increases to 85% from 60% of the storage of the hydrogen storage material. That is, a 25% increase in hydrogen desorption is provide by the present invention.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

What is claimed is:

1. A gas-assisted hydrogen desorption apparatus, comprising:
    a hydrogen cartridge, comprising a first valve on a first side of the hydrogen cartridge and connecting with a flow controller on a second side of the hydrogen cartridge;
    a hydrogen storage material, disposed in said hydrogen cartridge;
    a storage tank, comprising a second valve on one side of the storage tank and connecting with said flow controller by a third valve in another side of the storage tank, wherein the storage tank is filled with a carrier gas;
    wherein turning on said first valve desorbs hydrogen in said hydrogen cartridge to atmospheric pressure, and turning on said third valve introduces said carrier gas into said hydrogen cartridge to further desorb hydrogen within said hydrogen cartridge.

2. The desorption apparatus of claim 1, wherein said hydrogen storage material is activated carbon materials, carbon nanotubes, or microporous metal organic materials.

3. The desorption apparatus of claim 1, wherein said carrier gas is hydrogen.

4. The desorption apparatus of claim 2, wherein said carrier gas is hydrogen.

5. A gas-assisted hydrogen desorption method, comprising the following steps:
    providing a gas-assisted hydrogen desorption apparatus, wherein hydrogen has already been stored in a hydrogen cartridge;
    turning on a first valve to desorb said hydrogen in said hydrogen cartridge;
    when a pressure in said hydrogen cartridge decreases to atmospheric pressure, turning on a third valve to introduce a carrier gas into said hydrogen cartridge, and using a flow controller to control a flow rate of said carrier gas; and
    maintaining said third valve open until said hydrogen stored in said hydrogen cartridge cannot be desorbed anymore.

6. The desorption method of claim 5, wherein said carrier gas is hydrogen.

7. The desorption method of claim 6, wherein, said flow rate of said carrier gas is 100 sccm.

8. The desorption method of claim 5, wherein, said flow rate of said carrier gas is 100 sccm.

* * * * *